United States Patent
Betz et al.

(10) Patent No.: US 9,787,697 B2
(45) Date of Patent: *Oct. 10, 2017

(54) PROVIDING SECURITY SERVICES WITHIN A CLOUD COMPUTING ENVIRONMENT

(71) Applicant: International Business Machines Corporation, Armonk, NY (US)

(72) Inventors: Linda N. Betz, Windsor, CT (US); Wesley J. Ho, San Francisco, CA (US); Charles S. Lingafelt, Durham, NC (US); David P. Merrill, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 14/812,100

(22) Filed: Jul. 29, 2015

(65) Prior Publication Data

US 2015/0334127 A1    Nov. 19, 2015

Related U.S. Application Data

(63) Continuation of application No. 12/717,202, filed on Mar. 4, 2010, now Pat. No. 9,129,086.

(51) Int. Cl.
*H04L 29/06* (2006.01)
*G06F 21/00* (2013.01)
*H04L 9/32* (2006.01)

(52) U.S. Cl.
CPC .......... *H04L 63/1416* (2013.01); *G06F 21/00* (2013.01); *H04L 9/32* (2013.01);
(Continued)

(58) Field of Classification Search
None
See application file for complete search history.

(56) References Cited

U.S. PATENT DOCUMENTS

| 6,766,453 B1 | 7/2004 | Nessett et al. |
| 2003/0149880 A1 | 8/2003 | Shamsaasef et al. |

(Continued)

OTHER PUBLICATIONS

Greene, T., "Cloud Security Alliance, Jericho Forum agendas align", www.itworld.com, Apr. 24, 2009, 2 pages.
(Continued)

*Primary Examiner* — Harunur Rashid
*Assistant Examiner* — Wayne An
(74) *Attorney, Agent, or Firm* — Noah A. Sharkan; Maxine L. Barasch; Keohane & D'Alessandro PLLC

(57) ABSTRACT

Embodiments of the present invention allow for the provisioning of security services within a Cloud computing environment by third parties. Specifically, under the present invention, a Cloud provider will publish a set of potential security attributes (e.g., a list), which can be monitored, to the Cloud customer. The Cloud customer will designate/select one or more of those attributes that the Cloud customer wishes to have monitored for one or more Cloud resources that it is using. The Cloud provider will then provide to the Cloud customer a set of third party security service providers capable of monitoring the attributes the Cloud customer designated. The Cloud customer will then select one or more third party providers from the provided set, and the Cloud provider will associate the given Cloud resources with the respective third party providers. Once third party providers have been associated with Cloud resources, a secure relationship between the third party provider(s) and the Cloud providers will be established.

8 Claims, 5 Drawing Sheets

(52) U.S. Cl.
CPC .......... *H04L 63/20* (2013.01); *H04L 63/0227* (2013.01); *H04L 63/08* (2013.01); *H04L 63/10* (2013.01); *H04L 63/1408* (2013.01); *H04L 63/1433* (2013.01); *H04L 63/1441* (2013.01)

(56) References Cited

U.S. PATENT DOCUMENTS

| | | |
|---|---|---|
| 2006/0053296 A1 | 3/2006 | Busboom et al. |
| 2006/0206932 A1 | 9/2006 | Chong |
| 2006/0206940 A1* | 9/2006 | Strauss ............... H04L 63/1408 726/23 |
| 2007/0067620 A1 | 3/2007 | Jevans |
| 2008/0229417 A1* | 9/2008 | Genty ...................... G06N 5/04 726/22 |
| 2009/0328216 A1* | 12/2009 | Rafalovich ......... H04L 43/0876 726/23 |
| 2010/0169497 A1* | 7/2010 | Klimentiev ............ G06F 9/546 709/228 |
| 2010/0235355 A1* | 9/2010 | Carter ..................... G06F 9/505 707/736 |
| 2011/0219434 A1 | 9/2011 | Betz et al. |

OTHER PUBLICATIONS

Kanaracus, C., "Cloud Security Alliance issues new guidelines", www.itworld.com, Dec. 17, 2009, 1 page.

Mell et al., "The NIST Definition of Cloud Computing", National Institute of Standards and Technology, Information Technology Laboratory, Version 15, Oct. 7, 2009, 2 pages.

Maitland, J., "Keeping Control Isn't Easy", Chapter 4: Cloud-Based Infrastructure, SearchCloudComputing.com, Publication Date: Oct. 2009, 17 pages.

Nirav B. Patel, USPTO Office Action, U.S. Appl. No. 12/717,202, Mail Date Oct. 4, 2012, 10 pages.

Nirav B. Patel, USPTO Final Office Action, U.S. Appl. No. 12/717,202, Notification Date Mar. 20, 2013, 14 pages.

Nirav B. Patel, USPTO Final Office Action, U.S. Appl. No. 12/717,202, Notification Date May 8, 2014, 15 pages.

Nirav B. Patel, USPTO Office Action, U.S. Appl. No. 12/717,202, Notification Date Oct. 3, 2014, 9 pages.

Nirav B. Patel, USPTO Final Office Action, U.S. Appl. No. 12/717,202, Notification Date Feb. 20, 2015, 12 pages.

Nirav B. Patel, USPTO Notice of Allowance and Fee(s) Due, U.S. Appl. No. 12/717,202, Date Mailed May 5, 2015, 8 pages.

* cited by examiner

PROVIDING SECURITY SERVICES WITHIN A CLOUD COMPUTING ENVIRONMENT

CROSS-REFERENCE TO RELATED APPLICATIONS

The present patent document is a continuation of U.S. patent application Ser. No. 12/717,202, filed Mar. 4, 2010, entitled "PROVIDING SECURITY SERVICES WITHIN A CLOUD COMPUTING ENVIRONMENT", the disclosure of which is incorporated herein by reference.

TECHNICAL FIELD

The present invention generally relates to Cloud computing. Specifically, the present invention relates to the provisioning of security services within a Cloud computing environment (e.g., by third parties).

BACKGROUND

The Cloud computing environment is an enhancement to the predecessor grid environment, whereby multiple grids and other computation resources may be further abstracted by a Cloud layer, thus making disparate devices appear to an end-user as a single pool of seamless resources. These resources may include such things as physical or logical compute engines, servers and devices, device memory, storage devices, networks, business applications and other software, and the like.

Cloud computing is evolving toward a mature computing environment. In Cloud computing, security services are currently limited to those provided by the Cloud infrastructure or by the customers of the Cloud themselves. This type of specialization and availability of these types of services often occurs several years after the establishment of the basic business model and supporting infrastructure. As such, optimal security is often lacking within many Cloud computing environments.

SUMMARY

In general, an embodiment of the present invention allows for the provisioning of security services within a Cloud computing environment by third parties. Specifically, under the present invention, a Cloud provider will publish a set of potential security attributes (e.g., a list), which can be monitored, to the Cloud customer. The Cloud customer will designate/select one or more of those attributes that the Cloud customer wishes to have monitored for one or more Cloud resources that it is using. The Cloud provider will then provide to the Cloud customer a set of third party security service providers capable of monitoring the attributes the Cloud customer designated. The Cloud customer will then select one or more third party providers from the provided set, and the Cloud provider will associate the given Cloud resources with the respective third party providers. Once third party providers have been associated with Cloud resources, a secure relationship between the third party provider(s) and the Cloud providers will be established.

A first aspect of the present invention provides a method for providing security services within a Cloud computing environment, comprising: identifying a set of potential security attributes a Cloud customer that are monitorable; receiving a selection of a set of security attributes to be monitored for the Cloud customer, the set of security attributes being selected from the set of potential security attributes; identifying a set of security service providers capable of monitoring the set of security attributes selected for the Cloud customer; receiving a designation of at least one security service provider from the set of security service providers; associating at least one Cloud resource used by the Cloud customer with the at least one security service provider; and establishing a secure relationship between the Cloud provider and the at least one security service provider.

A second aspect of the present invention provides a system for providing security services within a Cloud computing environment, comprising: a memory medium comprising instructions; a bus coupled to the memory medium; and a processor coupled to the bus that when executing the instructions causes the system to: identify a set of potential security attributes a Cloud customer that are monitorable; receive a selection of a set of security attributes to be monitored for the Cloud customer, the set of security attributes being selected from the set of potential security attributes; identify a set of security service providers capable of monitoring the set of security attributes selected for the Cloud customer; receive a designation of at least one security service provider from the set of security service providers; associate at least one Cloud resource used by the Cloud customer with the at least one security service provider; and establish a secure relationship between the Cloud provider and the at least one security service provider.

A third aspect of the present invention provides a computer readable medium containing a program product for providing security services within a Cloud computing environment, the computer readable medium comprising program code for causing a computer to: identify a set of potential security attributes a Cloud customer that are monitorable; receive a selection of a set of security attributes to be monitored for the Cloud customer, the set of security attributes being selected from the set of potential security attributes; identify a set of security service providers capable of monitoring the set of security attributes selected for the Cloud customer; receive a designation of at least one security service provider from the set of security service providers; associate at least one Cloud resource used by the Cloud customer with the at least one security service provider; and establish a secure relationship between the Cloud provider and the at least one security service provider.

A fourth aspect of the present invention provides a method for deploying a system for providing security services within a Cloud computing environment, comprising: providing a computer infrastructure being operable to: identify a set of potential security attributes a Cloud customer that are monitorable; receive a selection of a set of security attributes to be monitored for the Cloud customer, the set of security attributes being selected from the set of potential security attributes; identify a set of security service providers capable of monitoring the set of security attributes selected for the Cloud customer; receive a designation of at least one security service provider from the set of security service providers; associate at least one Cloud resource used by the Cloud customer with the at least one security service provider; and establish a secure relationship between the Cloud provider and the at least one security service provider.

BRIEF DESCRIPTION OF THE DRAWINGS

These and other features of this invention will be more readily understood from the following detailed description of the various aspects of the invention taken in conjunction with the accompanying drawings in which.

Figure 1:
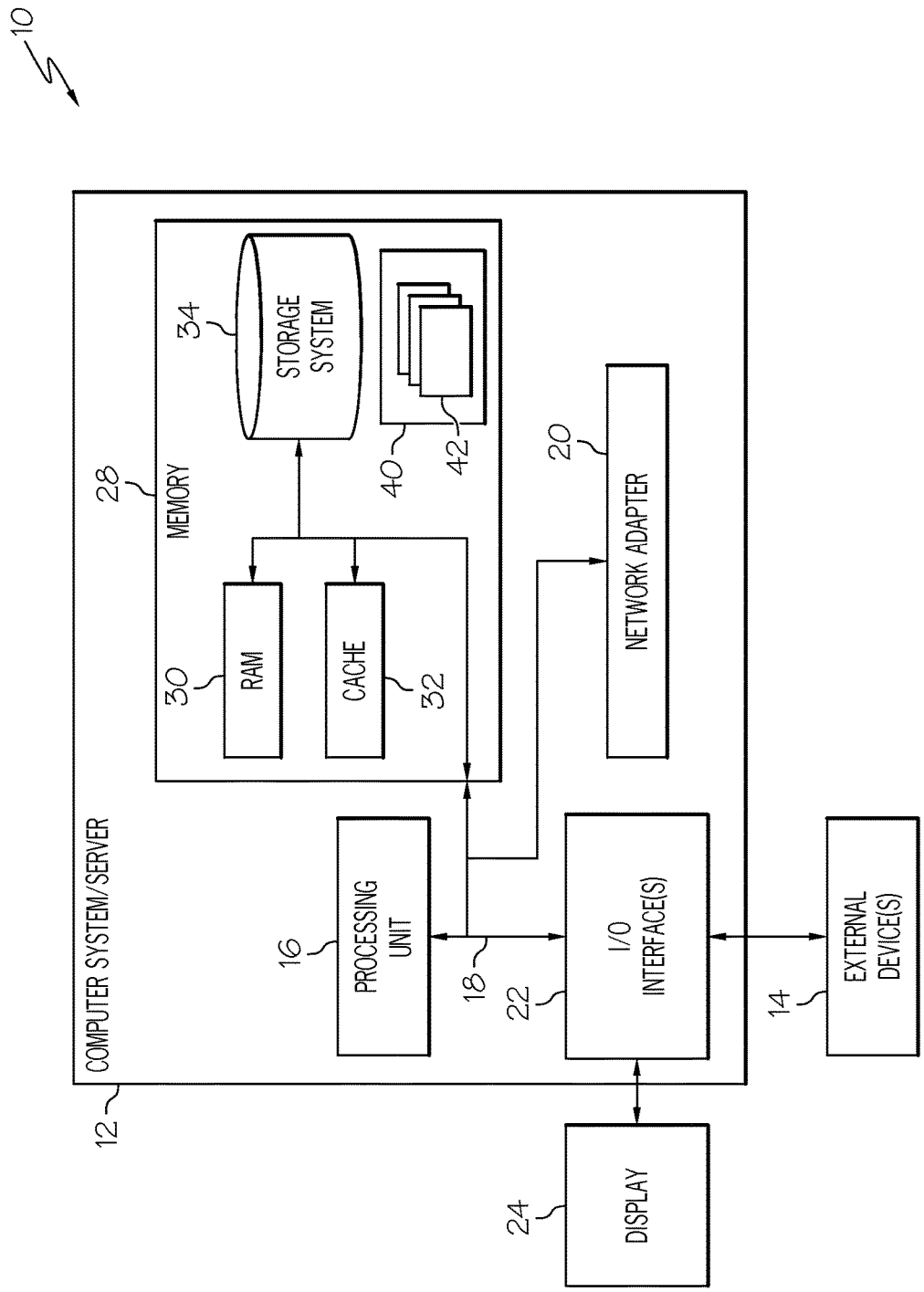
FIG. 1 depicts a Cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

For convenience, the Detailed Description has the following sections:

I. Cloud Computing Definitions
II. Detailed Implementation of Embodiments of the invention I. Cloud Computing Definitions The following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is comprised of at least five characteristics, at least three service models, and at least four deployment models.

Characteristics are as follows:

On-demand self-service: A customer can unilaterally provision computing capabilities, such as server time and network storage, as needed automatically without requiring human interaction with each service's provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple customers using a multi-tenant model, with different physical and virtual resources dynamically assigned and reassigned according to customer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the customer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and customer of the utilized service.

Service Models are as follows:

Cloud Software as a Service (SaaS): The capability provided to the customer is to use the provider's applications running on a Cloud infrastructure. The applications are accessible from various client devices through a thin client interface such as a web browser (e.g., web-based e-mail). The customer does not manage or control the underlying Cloud infrastructure including network, servers, operating systems, storage, or even individual application capabilities, with the possible exception of limited user-specific application configuration settings.

Cloud Platform as a Service (PaaS): The capability provided to the customer is to deploy onto the Cloud infrastructure customer-created or acquired applications created using programming languages and tools supported by the provider. The customer does not manage or control the underlying Cloud infrastructure including networks, servers, operating systems, or storage, but has control over the deployed applications and possibly application-hosting environment configurations.

Cloud Infrastructure as a Service (IaaS): The capability provided to the customer is to provision processing, storage, networks, and other fundamental computing resources where the customer is able to deploy and run arbitrary software, which can include operating systems and applications. The customer does not manage or control the underlying Cloud infrastructure but has control over operating systems, storage, deployed applications, and possibly limited control of select networking components (e.g., host firewalls).

Deployment Models are as follows:

Private Cloud: The Cloud infrastructure is operated solely for an organization. It may be managed by the organization or a third party and may exist on-premises or off-premises.

Community Cloud: The Cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: The Cloud infrastructure is made available to the general public or a large industry group and is owned by an organization selling Cloud services.

Hybrid Cloud: The Cloud infrastructure is a composition of two or more Clouds (private, community, or public) that remain unique entities but are bound together by standardized or proprietary technology that enables data and application portability (e.g., Cloud bursting for load-balancing between Clouds).

A Cloud computing environment is service oriented with a focus on statelessness, low coupling, modularity, and semantic interoperability.

II. Detailed Implementation of Embodiments of the Invention

As indicated above, an embodiment of the present invention allows for the provisioning of security services within a Cloud computing environment by third parties. Specifically, under the present invention, a Cloud provider will publish a set of potential security attributes (e.g., a list), which can be monitored, to the Cloud customer. The Cloud customer will designate/select one or more of those attributes that the Cloud customer wishes to have monitored for one or more Cloud resources that it is using. The Cloud provider will then provide to the Cloud customer a set of third party security service providers capable of monitoring the attributes the Cloud customer designated. The Cloud customer will then select one or more third party providers from the provided set, and the Cloud provider will associate the given Cloud resources with the respective third party providers. Once third party providers have been associated with Cloud resources, a secure relationship between the third party provider(s) and the Cloud providers will be established.

Referring now to FIG. 1, a schematic of an exemplary Cloud computing node is shown. Cloud computing node 10 is only one example of a suitable Cloud computing node and is not intended to suggest any limitation as to the scope of use or functionality of the invention described herein. Regardless, Cloud computing node 10 is capable of being implemented and/or performing any of the functions set forth in Section I above.

In Cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable customer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
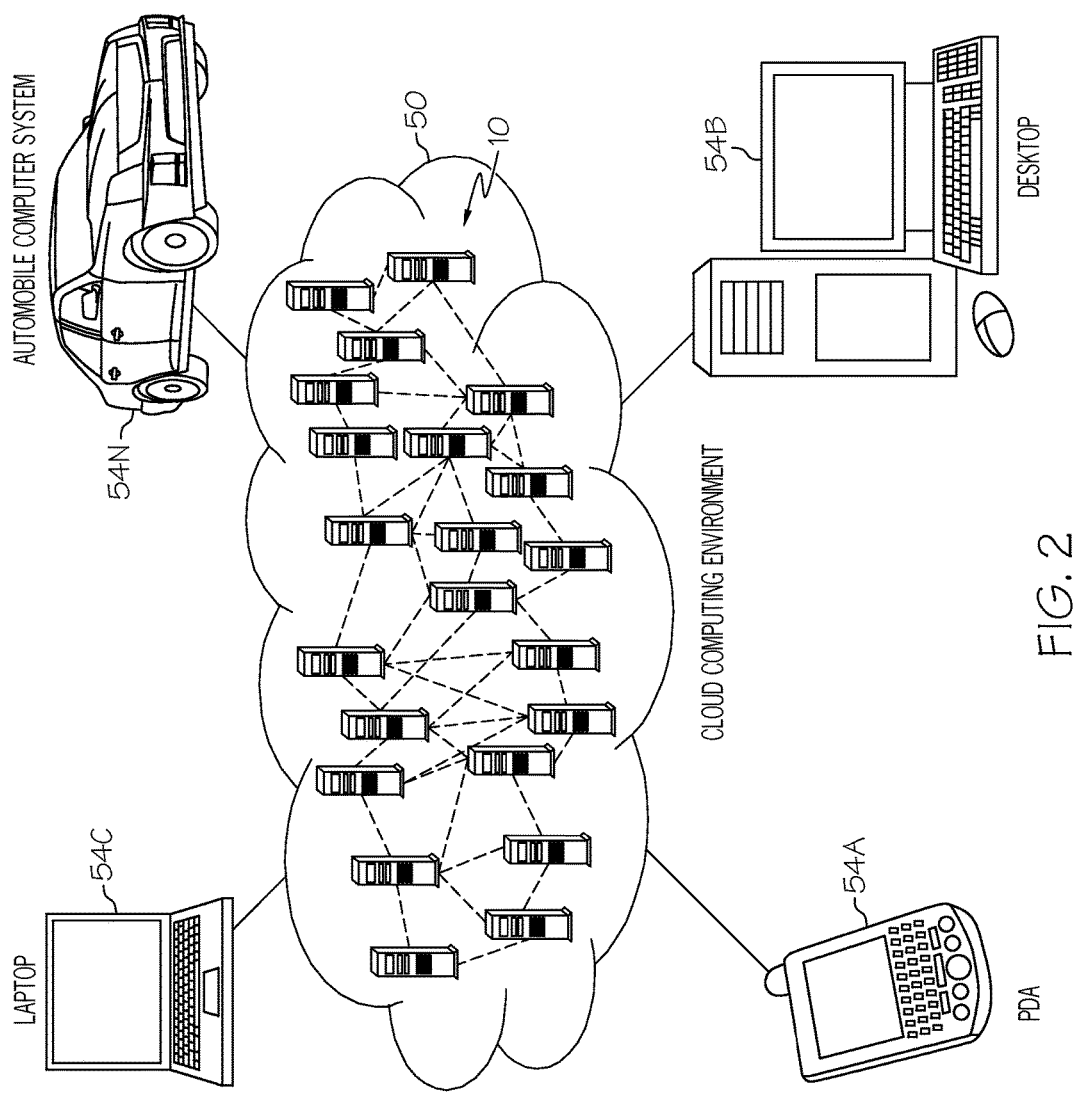
FIG. 2 depicts a Cloud computing environment according to an embodiment of the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms and/or software to be offered as services (as described above in Section I) from Cloud computing environment 50 so as to not require each client to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
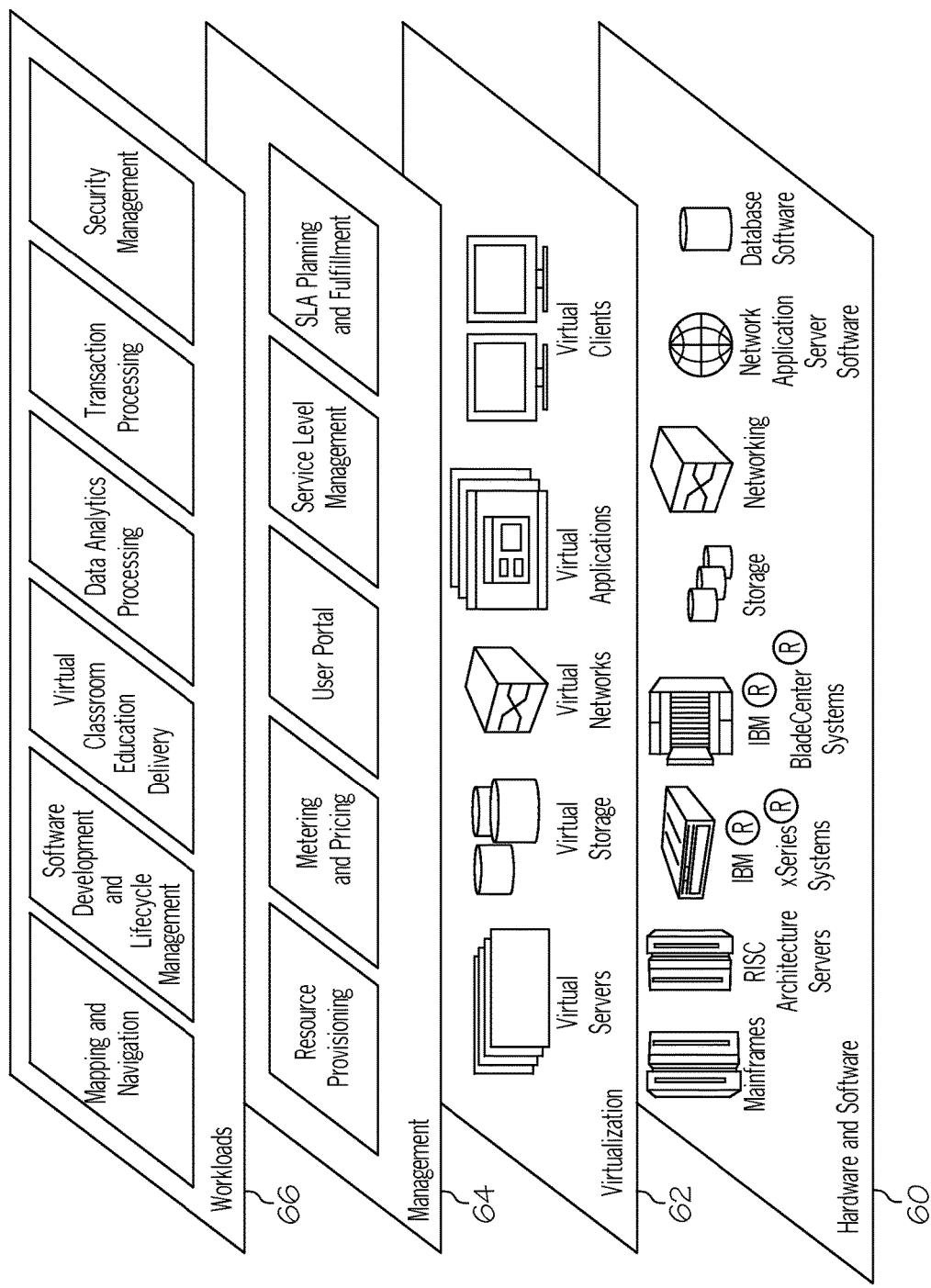
FIG. 3 depicts Cloud abstraction model layers according to an embodiment of the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only, and the invention is not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual applications; and virtual clients.

Management layer 64 provides the exemplary functions described below. Resource provisioning provides dynamic procurement of computing resources and other resources that are utilized to perform tasks within the Cloud computing environment. Metering and pricing provide cost tracking as resources are utilized within the Cloud computing environment, and billing or invoicing for consumption of these resources. In one example, these resources may comprise application software licenses. Security provides identity verification for users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides pre-arrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing; and security management. As mentioned above, all of the foregoing examples described with respect to FIG. 3 are illustrative only, and the invention is not limited to these examples.

It is understood all functions of the present invention as described herein are typically performed by the security management function of FIG. 3, which can be tangibly embodied as modules of program code 42 of program/utility 40 shown in FIG. 1.

Customers engaging in Cloud computing may desire to take precautions against existing and evolving security exposures. They will need protection against threats in the computing world including (but not limited to): (1) malware attacks such as viruses/malware; (2) loss of confidential information such as intellectual property and privacy data; (3) web application attacks that result in compromised infrastructure and customers; and (4) data leakage detection and prevention, intrusion prevention, access management services.

Embodiments of the present invention define an approach to allow a third party security service provider to provide security services under control of the Cloud customer. Today's model of fulfilling security services relies heavily on customers to develop, deploy, and manage their own infrastructure to mitigate against security risk exposures. Embodiments of this invention provide an alternative to the "in-house" method by enabling external fulfillment of security requirements. This gives both the customer and third party providers the ability to mitigate security risks in a more dynamically scalable and cost-effective manner.

Multiple embodiments are provided hereunder and are set forth in detail below. In general, the approach defines how the Cloud customer can act within the Cloud infrastructure to control a third party security service provider while ensuring the Cloud provider cannot manipulate the validation of the third party.

Figure 4:
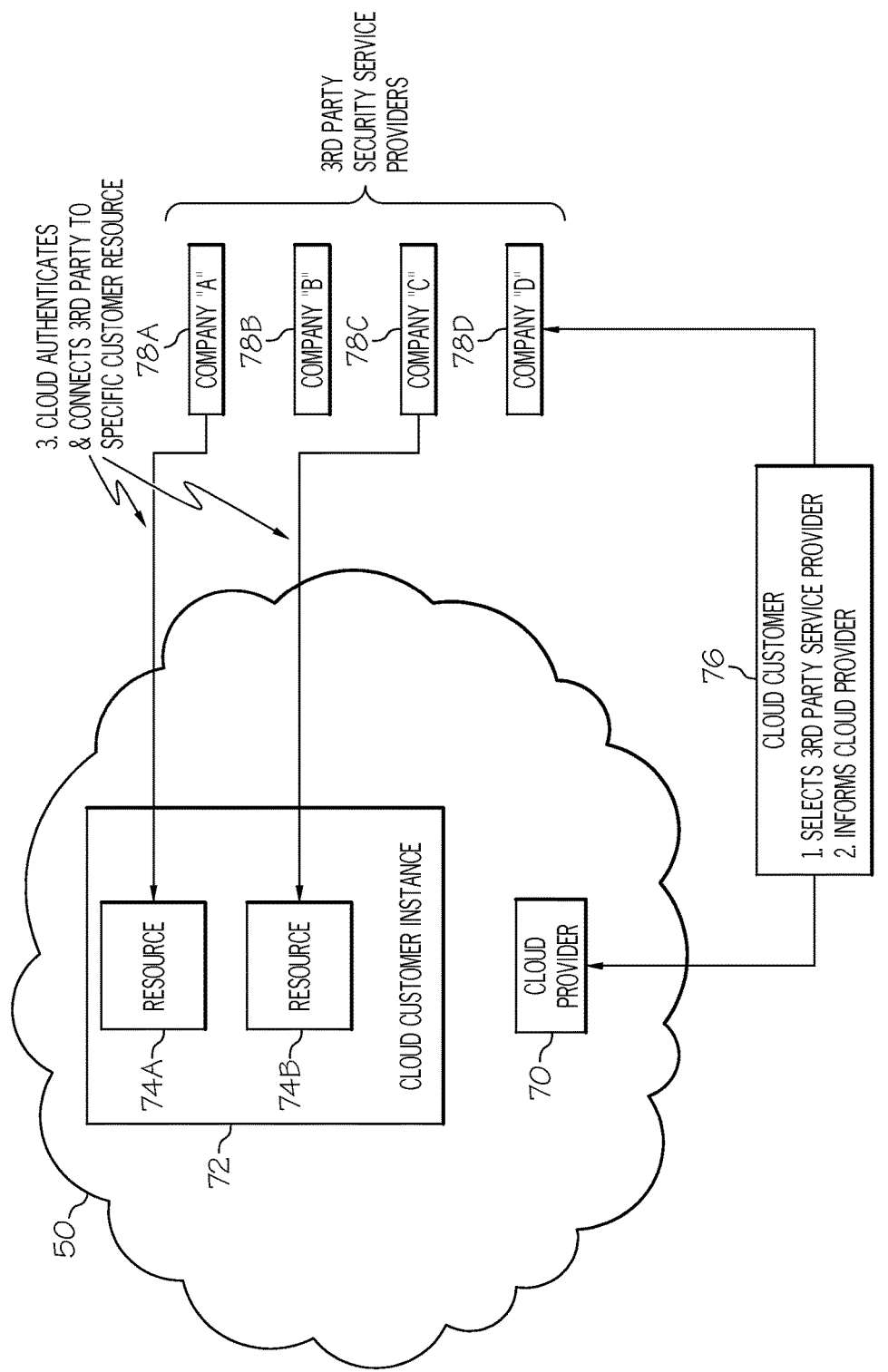
FIG. 4 depicts a system for managing security services within a Cloud computing environment according to an embodiment of the present invention.

Referring now to FIG. 4, an illustrative system diagram according to an embodiment of the present invention is shown. In this diagram, Cloud environment 50 (as managed by cloud provider 70) is depicted having Cloud resources 74A-B within Cloud customer instance 72. Assume in this example that Cloud customer instance 72 is associated with Cloud customer 76. Further assume that Cloud customer 76 wishes to have a certain level of security for Cloud resources 74A-B. Embodiments of the present invention allow for a set (i.e., at least one) of third party security service providers (hereinafter SSPs 78A-D) to provide the desired security services. It should be understood in advance that although a certain quantity of SSPs 78A-D are shown in FIG. 4, the teachings recited herein could be implemented with any quantity thereof.

Figure 5:
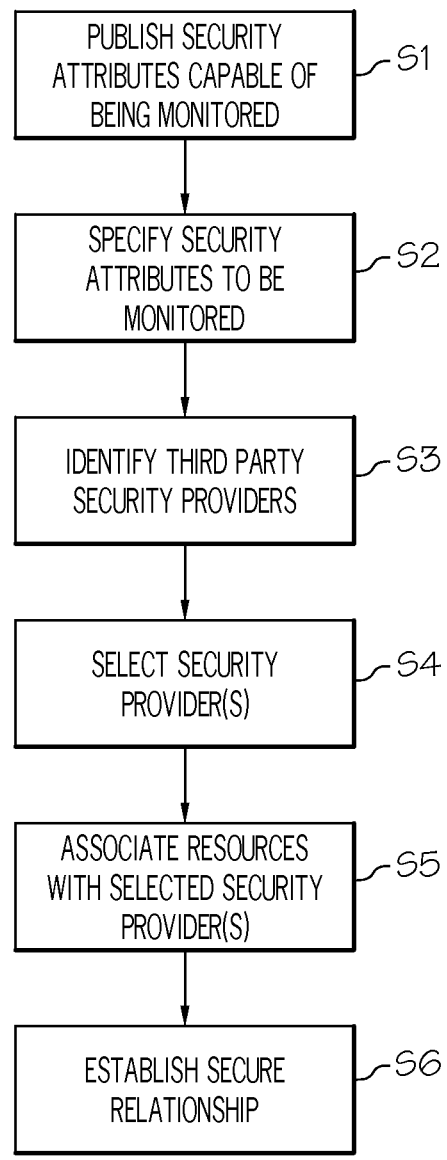
FIG. 5 depicts a method flow diagram according to an embodiment of the present invention.

The manner in which security services are provided externally hereunder will be discussed in conjunction with the method flow diagram of FIG. 5 and the examples that follow. In step S1, a set of potential security attributes that can be monitored are identified/published to a Cloud customer. In step S2, set of security attributes to be monitored for the Cloud customer is selected (e.g., by the Cloud customer) from the set of potential security attributes. As indicated above the set of potential security attributes can include one or more of the following: alerting thresholds, event specific alerts, a number of access attempts, a number of access attempts above a threshold, a number of blocked attempts, a number of blocked attempts above a threshold, alerts on transfer of sensitive data, attempts to access accounts, attempts to delete data, or patch levels applied.

Regardless, in step S3, a set of security service providers capable of monitoring the selected set of security attributes will be identified/published to the Cloud customer. In step S4, the Cloud customer will select/designate at least one of the security service providers. In step S5, at least one Cloud resource used by the Cloud customer will be associated with the at least one security service provider. It is understood that any quantity of security service providers can be selected, and that any single security service provider could be associated with any quantity of Cloud resources (i.e., a one-to-one relationship is not required). Nevertheless, in step S6, a secure relationship is established between the Cloud provider and the at least one security service provider.

It is understood that these functions are enabled and/or managed by the security management function of FIG. 3. For example, the identification/publishing functions, the receipt of selections or designations, etc., can all be done by the security management function. As indicated above, the security management function can be tangibly embodied as security management program/utility 40 having modules of program code 42 (FIG. 1).

Regardless, under the present invention, there are multiple ways for establishing the secure relationship between the security service provider(s) and the Cloud provider. Examples include (but are not limited to): (1) the Cloud customer generates credentials; (2) the Cloud provider generates credentials; (3) the security service provider generates credentials; and/or (4) the Cloud provider pre-authenticates the security service provider. Security credentials can be one or more of a variety of items, including public/private key pairs, digital certificates, userid and password, biometrics, multiple factor authentication, etc. In any event, these embodiments will be further described below. To provide a frame of reference for the establishment of the secure relationship, the preceding steps will be repeated.

Alternate Embodiment 1: Cloud Customer Generates Credential (Used to Authenticate Security Service Provider):

1. Cloud provider publishes a set of potential security attributes to the Cloud customer that are monitorable.
2. Cloud customer specifies to Cloud provider the security attributes and resources to be monitored as well as any desired performance targets (e.g., SLAs).
3. Cloud provider publishes to Cloud customer, a set of security service providers that can be integrated to satisfy their infrastructure and/or security requirements.
4. Cloud customer specifies to Cloud provider one or more security service providers and Cloud resources to be serviced.
5. Cloud provider associates Cloud resource to be monitored with security service provider.
6. Cloud customer specifies to Cloud provider the one or more credential for use in validation of the identity/legitimacy of the service provider.
7. Cloud customer transmits or specifies a one or more credentials to security service provider.
8. Security service provider presents credentials to Cloud provider.
9. Cloud Provider: If security service provider identity=Cloud customer specified security service identity, and if Cloud stored, customer provided, credential=credential presented by the service provider, then Cloud provider sends security information to security service provider (e.g., output from sensors in Cloud network, output from host based intrusion detection, antivirus alerts, data on patch application).
10. Security service provider analyzes information from Cloud provider and reports on the Cloud provider's attainment of security targets and/or security reports.

Alternate Embodiment 2: Cloud Provider Generates Credential (Used to Authenticate Security Service Provider):

1. Cloud provider publishes a set of potential security attributes to the Cloud customer that are monitorable.
2. Cloud customer specifies to Cloud provider the security attributes and resources to be monitored as well as any desired performance targets (e.g., SLAs).
3. Cloud provider publishes to Cloud customer a set of security service providers.
4. Cloud customer specifies to Cloud provider one or more security service providers and Cloud resources to be serviced.
5. Cloud provider associates Cloud resource to be monitored with security service provider.

6. Cloud provider generates one or more credentials for use in validation of the identity/legitimacy of the security monitoring service and transmits credential(s) to Cloud user.
7. Cloud customer transmits credential(s) to security service provider.
8. Security service provider presents credential(s) to Cloud provider.
9. Cloud Provider: If security service provider identity=Cloud customer specified security service identity and if Cloud stored credential=credential presented by the service provider, then Cloud provider sends security information to security service provider (e.g., output from sensors in Cloud network, output from host-based intrusion detection, antivirus alerts, data on patch penetration).
10. Security service provider analyzes information from Cloud provider and reports on the Cloud provider's attainment of security targets and/or security reports.

Alternate Embodiment 3: Security Service Provider Generates Credential (Used to Authenticate Security Service Provider):

1. Cloud provider publishes a set of potential security attributes to the Cloud customer that are monitorable.
2. Cloud customer specifies to Cloud provider the security attributes and resources to be monitored as well as any desired performance targets (e.g., SLAs).
3. Cloud provider publishes to Cloud customer a set of security service providers.
4. Cloud customer specifies to Cloud provider one or more security service providers and Cloud resources to be serviced.
5. Cloud provider associates Cloud resource to be monitored with security service provider.
6. Security service provider generates one or more credentials for use in validation of the identity/legitimacy of the security monitoring service and transmits credential(s) to Cloud user and or Cloud provider.
7. Security service provider presents credential(s) to Cloud provider.
8. Cloud Provider: If security service provider identity=Cloud customer specified security service identity and if Cloud stored credential=credential presented by the service provider, then Cloud provider sends security information to security service provider (e.g., output from sensors in Cloud network, output from host based intrusion detection, antivirus alerts, data on patch penetration).
9. Security service provider analyzes information from Cloud provider and reports the Cloud provider's attainment to security targets and/or security reports.

Alternate Embodiment 4: Cloud Provider Pre-Authenticates Security Service Provider:

1 Cloud provider publishes a set of potential security attributes to the Cloud customer that are monitorable.
2. Cloud customer specifies to Cloud provider the security attributes and resources to be monitored as well as any desired performance targets (e.g., SLAs).
3. Cloud provider publishes a set of security attributes that can be monitored by a set of security service providers to the Cloud customer.
4. Cloud customer specifies to Cloud provider the security attributes to be monitored and targets.
5. Cloud customer specifies to Cloud provider one or more security service providers.
6. Cloud provider associates Cloud resource to be monitored with security service provider.

7. Cloud provider and security service provider exchange credential(s) to validate the identity/legitimacy of the security monitoring service and the identity of the Cloud provider.

8. Cloud provider sends security information to security service provider.

9. Security service provider analyzes information from Cloud provider and reports the Cloud provider's attainment to security targets and/or security reports.

While shown and described herein as a security management solution, it is understood that the invention further provides various alternative embodiments. For example, in one embodiment, the invention provides a computer-readable/useable medium that includes computer program code to enable a computer infrastructure to provide security management functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide security management. In this case, the service provider can create, maintain, support, etc., a computer infrastructure, such as computer system 12 (FIG. 1) that performs the processes of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing security management functionality. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for providing security services by a cloud provider within a Cloud computing environment to a Cloud customer, comprising:

The cloud provider:

identifying a set of potential security attributes that are monitorable to the Cloud customer;

receiving, from the Cloud customer, a selection of a set of security attributes to be monitored for one or more Cloud resources used by the Cloud customer, the set of security attributes being selected from the set of potential security attributes;

identifying a set of security service providers capable of monitoring the set of security attributes selected by the Cloud customer;

receiving, from the Cloud customer, a designation of at least one security service provider from the set of security service providers;

associating the one or more Cloud resources with the designated at least one security service provider;

receiving, from the Cloud customer, a credential for use in validation of the designated at least one security service provider;

sending the credential to the designated at least one security service provider;

establishing a secure relationship between the Cloud provider and the designated at least one security service provider; and sending security information, via the secure relationship, collected in a Cloud computing network to the designated at least one security service provider for monitoring the set of security attributes selected by the Cloud customer, wherein the security information comprises output from sensors, host-bases intrusion detection, antivirus alerts, and data on patch penetration;

wherein the designated at least one security service provider:

analyzes the security information; and reports to the Cloud provider result of the analyzing.

2. The method of claim 1, further comprising reporting on the Cloud provider's attainment of security targets.

3. The method of claim 1, the set of security potential attributes comprising at least one of the following: alerting thresholds, event specific alerts, a number of access attempts, a number of access attempts above a threshold, a number of blocked attempts, a number of blocked attempts above a threshold, alerts on transfer of sensitive data, attempts to access accounts, attempts to delete data, or patch levels applied.

4. A system for providing security services by a cloud provider within a Cloud computing environment to a Cloud customer, comprising:

a memory medium comprising instructions;

a bus coupled to the memory medium; and a processor coupled to the bus that when executing the instructions causes the system to:

identify a set of potential security attributes that are monitorable to the Cloud customer;

receive, from the Cloud customer, a selection of a set of security attributes to be monitored for one or more Cloud resources used by the Cloud customer, the set of security attributes being selected from the set of potential security attributes;

identify a set of security service providers capable of monitoring the set of security attributes selected by the Cloud customer;

receive, from the Cloud customer, a designation of at least one security service provider from the set of security service providers;

associate the one or more Cloud resources used by the Cloud customer with the designated at least one security service provider;

receiving from the Cloud customer a credential for use in validation of the designated at least one security service provider;

send the credential to the designated at least one security service provider;

establish a secure relationship between the Cloud provider and the designated at least one security service provider; and send security information, via the secure relationship, collected in a Cloud computing network to the designated at least one security service provider for monitoring the set of security attributes selected by the Cloud customer, wherein the security information comprises output from sensors, host-bases intrusion detection, antivirus alerts, and data on patch penetration;

wherein the designated at least one security service provider:

analyzes the security information; and reports to the Cloud provider result of the analyzing.

5. The system of claim 4, wherein the executing of the instructions causes the system further to report on the Cloud provider's attainment of security targets.

6. A computer readable hardware storage device containing a program product for providing security services within a Cloud computing environment, the computer readable hardware storage device comprising program code for causing a computer to:

identify a set of potential security attributes of a Cloud customer that are monitorable to the Cloud customer;

receive, from the Cloud customer a selection of a set of security attributes to be monitored for one or more Cloud resources used by the Cloud customer, the set of security attributes being selected from the set of potential security attributes;

identify a set of security service providers capable of monitoring the set of security attributes selected by the Cloud customer;

receive, from the Cloud customer a designation of at least one security service provider from the set of security service providers;

associate the one or more Cloud resources with the designated at least one security service provider;

receive from the Cloud customer a credential for use in validation of the designated at least one security service provider;

send the credential to the designated at least one security service provider;

establish a secure relationship between the Cloud provider and the designated at least one security service provider; and send security information, via the secure relationship, collected in a Cloud computing network to the designated at least one security service provider for monitoring the set of security attributes selected by the Cloud customer, wherein the security information comprises output from sensors, host-bases intrusion detection, antivirus alerts, and data on patch penetration;

wherein the designated at least one security service provider:

analyzes the security information; and reports to the Cloud provider result of the analyzing.

7. The computer readable hardware storage device of claim 6, wherein the computer readable hardware storage device comprises program code for further causing a computer to report on the Cloud provider's attainment of security targets.

8. The computer readable hardware storage device containing the program product of claim 6, the computer readable hardware storage device further comprising program code for further causing the computer to monitor the set of security attributes for the Cloud customer using the secure relationship.

* * * * *